UNITED STATES PATENT OFFICE.

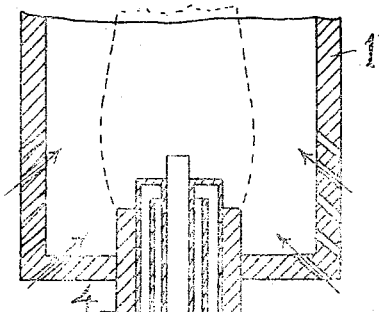
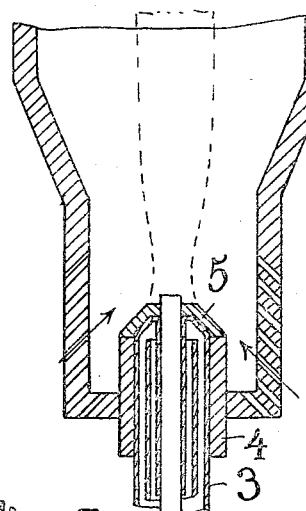
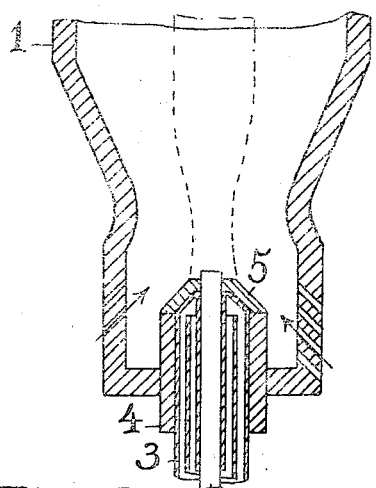
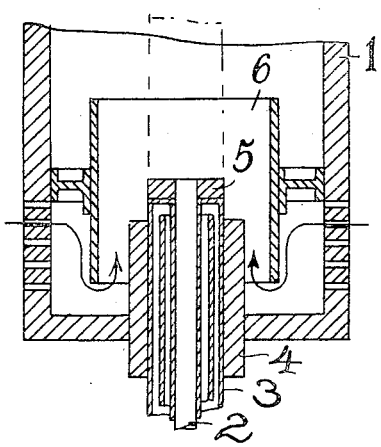
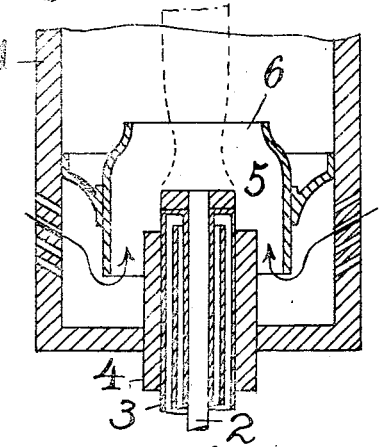

SIGURD HEIER, OF RJUKAN, NORWAY, ASSIGNOR TO NORSK HYDRO-ELEKTRISK KVAELSTOFAKTIESELSKAB, OF CHRISTIANIA, NORWAY.

ELECTRODE.

1,317,576.  Specification of Letters Patent.  Patented Sept. 30, 1919.

Application filed July 29, 1916. Serial No. 112,062.

*To all whom it may concern:*

Be it known that I, SIGURD HEIER, a subject of the King of Norway, residing at Rjukan, Norway, have invented certain new and useful Improvements in Electrodes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to electric arc furnaces and the like and the object of the invention is to increase the durability of electrodes especially of rod electrodes. The invention is particularly of importance in electric arc furnaces, the arcs of which are protracted and stabilized by means of air currents, but the method may also be used in large arc lamps working on the same principle. The chief value of the method is due to the fact, that it allows the use of carbon or say graphic electrodes even for the greatest quantities of energy. The method has been tested in connection with Schönherr furnaces with rotary movement of the incoming air, but is applicable also for straight air currents supplied for instance through slits or mouth-pieces.

The invention is based on the observation, that the starting points of the arc are disposed to persist in spaces of vacuum caused by the air movement or in places, where the air is relatively at rest.

The method used by the present invention consists in conducting the air into the flame chamber in such a manner, that the vacuum space produced by the movement of the air, and situated in the shelter of, or in a continuation of, the electrode is thus limited so that this zone covers as accurately as possible the working surface of the electrode, in case of a round rod electrode then the circular section of the latter.

Also the air is supplied in such a way, that it is forced with a certain pressure against the electrode and moves with increased velocity along the sides of the electrode adjacent to its working surface in order to prevent the arcs from passing over to the sides of the electrode or to the cooling or other device arranged around the electrode and forming a part of the electrode construction.

As the invention is preferably carried out in connection with water-cooled graphite electrodes and has been tested in a tube furnace, the result obtained with this type of furnaces will be sufficient to explain the nature and importance of the invention.

When conducting the air in the normal manner, the consumption of the electrodes could be delayed to some degree only by using electrodes of very large sectional area. But with such increased section it is impossible to have the electrode uniformly cooled, and therefore the flame will hollow the surface of the electrode. The electrode consumption consequently is still very large and the ability of the furnace to be regulated and stabilized is diminished to such an extent that the working is rendered impossible. The conditions can be but little mended by providing the electrodes with cores of slow-burning substances such as second class conductors and this remedy involves on the other hand certain new difficulties of working.

By the new method of supplying the air indicated above all these difficulties are surmounted. Although the method allows a much less sectional area of electrode, the consumption of electrode material is extremely low and uniform on the different parts of the electrode surface. This is due partly to the more uniform cooling effect and partly to the more regular wandering of the arcs over the different parts of the electrode surface. In order to prevent the electrode from assuming a pointed form during the burning, it may be provided with a core of more combustible material for instance a metal wick. The effect of the new method of air conduction may eventually be assisted by influencing magnetically the wandering of the starting points of the arcs.

On the annexed drawings: Figures 1, 2, 3, 4 and 5 represent vertical sections through the electrode construction and the surrounding parts of the flame chamber in electric arc furnaces of the Schönherr type.

In the figures 1 is the end of a flame tube provided with any known for instance rotary, conductor of air as indicated by the arrows, 2 is the electrode surrounded by the cooler 3 and the insulating guide tube 4.

In Fig. 1 is shown by way of example a usual arrangement of the flame chamber and the electrode. Through the passage of the air a vacuum space is produced as indicated by the dotted lines, and the end of the arc is free to play now on the electrode, now on the cooler, thereby destroying the latter.

When however the furnace is built according to Fig. 2 or 3 with a narrowed section around the electrode, the air whirl is likewise narrowed, and the vacuum space assumes approximately the shape indicated in these figures. The starting points of the arc are accordingly forced closer together. Owing to the greater velocity of the air along the electrode, the arcs can no more subsist on the sides of the electrode or of the cooler. By means of an interchangeable covering ring 5 (Figs. 2-5) of graphite or metal for instance, the cooler may be still better protected, for even if the ring assumes quite a high temperature, the altered conditions of pressure will prevent the arc from passing over to it. Most conveniently the ring is given such a shape, as to facilitate the intended effect of the air.

The extension and shape of the narrowing relatively to the section surface of the electrode depends upon the quantities of energy and of air that are used, and on the location and direction of the air-holes, these details being simply a matter of construction.

According to the modification shown in Figs. 4-5 the narrowing is produced by placing a circular screen 6, in a tube furnace of the usual type.

The effect that is generally obtained by a narrowing in the undermost part of the furnace or by means of a screen may be enhanced by special construction of the narrowing or of the screen, as is shown by way of example in Fig. 3, where the narrowed part of the furnace and in Fig. 5, the screen, is given such a shape that a deflecting effect is obtained.

Claims:

1. The combination with an electric arc furnace having a series of gas inlet ports through its sides and at its lower end arranged to direct gas currents away from the furnace shaft walls and toward the center of the furnace chamber; of an electrode at the bottom of the furnace and arranged in proximity to said ports whereby air from said ports will be directed laterally toward said electrode and therealong and closely along the lower end of the arc with a speed and pressure sufficient to confine the foot of the arc to the end of the electrode.

2. In an electric arc furnace of the Schönherr type, an electrode, a cooler therefor, and an interchangeable cap on the cooler for protecting the front end of the same.

3. In an electric arc furnace, the combination with an electrode thereof surrounded by a cooler; of means for supplying air to and closely along said electrode at its active end and the corresponding end of the arc having a velocity and pressure sufficient to reduce the vacuum at the electrode during the formation of the arc to substantially the cross sectional area of the electrode.

4. In an electric arc furnace having a flame tube provided with air passages near its lower end, an electrode in said end, a cooler surrounding the electrode, and a screen supported within said furnace end at points above the air passages, said screen surrounding the cooler and electrode and extending above the latter whereby the air currents will be directed through the walls of the flame tube and thence between the screen and cooler at a pressure and speed sufficient to confine the foot of the arc to substantially the cross-section of the electrode.

5. In an electric arc furnace having a flame tube provided near its lower end with air passages, an electrode, and a cooler surrounding the latter in said end and proximate to said passages, a screen surrounding the end of the cooler and electrode and extending beyond the ends thereof and having an inwardly directed upper edge, and means for holding said screen spaced from the cooler and electrode for compelling the air currents from said passages to be directed between the screen and cooler at a speed and pressure sufficient to restrict the arc to substantially the cross-sectional area of the electrode.

6. In an electric arc furnace producing long electric arcs, the combination with the solid consumable electrode thereof; of means for conducting the air or gas to be treated at a speed and pressure sufficient to reduce the vacuum space at the foot points of the arc and confine the foot of the arc to the end of the consumable electrode.

7. In an electric arc furnace producing long electric arcs, the combination with the solid consumable electrode thereof; of means for directing the air or gas to be treated away from the furnace shaft wall and toward and along the electrode, and additional means for confining the air or gas current close to such consumable electrode at a speed and pressure sufficient to reduce the normal vacuum space at the foot of the arc and electrode end.

In testimony that I claim the foregoing as my invention, I have signed my name in presence of two subscribing witnesses.

SIGURD HEIER.

Witnesses:
C. FABRICIUS HANSEN,
C. VORMAN.